US012643415B2

(12) United States Patent
Gatti et al.

(10) Patent No.: US 12,643,415 B2
(45) Date of Patent: Jun. 2, 2026

(54) ELECTRIC POWERTRAIN WORK MODES

(71) Applicant: Cummins Inc., Columbus, IN (US)

(72) Inventors: Marco Gatti, Columbus, IN (US);
Rohit Saha, Columbus, IN (US)

(73) Assignee: Cummins Inc., Columbus, IN (US)

( * ) Notice: Subject to any disclaimer, the term of this
patent is extended or adjusted under 35
U.S.C. 154(b) by 139 days.

(21) Appl. No.: 18/692,652

(22) PCT Filed: Oct. 14, 2021

(86) PCT No.: PCT/IB2021/059440
§ 371 (c)(1),
(2) Date: Mar. 15, 2024

(87) PCT Pub. No.: WO2023/062412
PCT Pub. Date: Apr. 20, 2023

(65) Prior Publication Data
US 2024/0286491 A1     Aug. 29, 2024

(51) Int. Cl.
*B60L 15/20* (2006.01)
*B60L 1/00* (2006.01)
(Continued)

(52) U.S. Cl.
CPC ............... *B60L 15/20* (2013.01); *B60L 1/003*
(2013.01); *B60L 58/12* (2019.02); *B60L 58/30*
(2019.02);
(Continued)

(58) Field of Classification Search
CPC .......... B60L 15/20; B60L 1/003; B60L 58/12;
B60L 58/30; B60L 2200/40; B60L
2240/421; B60L 2240/423; B60L 2250/16
See application file for complete search history.

(56) References Cited

U.S. PATENT DOCUMENTS 9,694,684 B2    7/2017  Enomoto
2009/0287366 A1  11/2009  Davis
(Continued)

FOREIGN PATENT DOCUMENTS

CN     110670662 A     1/2020
JP     2000209702 A    7/2000
(Continued)

OTHER PUBLICATIONS

International Search Report and Written Opinion for International
patent application No. PCT/IB2021/059440, filed Oct. 14, 2021,
mailed Jul. 8, 2022.

*Primary Examiner* — Alan D Hutchinson
(74) *Attorney, Agent, or Firm* — Faegre Drinker Biddle &
Reath LLP

(57)     ABSTRACT

A control system for off-highway battery application pow-
ertrain systems that allows the operator to select one or more
performance/operating modes. The one or more perfor-
mance modes may be based on the work that needs to be
accomplished using the machine vs. the hours needed before
the next charge opportunity. Modes will take typically into
consideration battery management system performance
maps, Electric motor/inverter performance maps, pump per-
formance maps and other systems communicating with the
powertrain system. The operator is in control to optimize
refill and/or next battery charge. The operator may have the
option to select performance modes based on excavator
performance vs. battery life. Remaining time and warning
messages may be periodically sent to the operator based on
the performance mode selected and current state of charge.

20 Claims, 9 Drawing Sheets

(51) Int. Cl.
　　*B60L 58/12* 　　　　(2019.01)
　　*B60L 58/30* 　　　　(2019.01)
(52) U.S. Cl.
　　CPC ..... *B60L 2200/40* (2013.01); *B60L 2240/421*
　　　　(2013.01); *B60L 2240/423* (2013.01); *B60L*
　　　　　　　　　　　　　　*2250/16* (2013.01)

(56) 　　　　　　　References Cited

U.S. PATENT DOCUMENTS

| | | |
|---|---|---|
| 2010/0030447 A1 | 2/2010 | Smyth |
| 2011/0166733 A1 | 7/2011 | Yu et al. |
| 2013/0004281 A1 | 1/2013 | Anders |
| 2014/0171260 A1* | 6/2014 | Dalum ................. B60W 10/06 |
| | | 903/906 |
| 2016/0222631 A1 | 8/2016 | Kohno |
| 2017/0129359 A1* | 5/2017 | Dunlap ................... B60L 53/14 |
| 2023/0226913 A1* | 7/2023 | Glöckner ............... B60L 15/20 |
| | | 701/22 |

FOREIGN PATENT DOCUMENTS

| | | |
|---|---|---|
| JP | 2015140033 A | 8/2015 |
| KR | 20190071888 A | 6/2019 |
| WO | 2009088406 A2 | 7/2009 |
| WO | 2010056597 A1 | 5/2010 |
| WO | 2013155451 A1 | 10/2013 |

* cited by examiner

Representative Efficiency Contour for a typical
Swashplate Pump/Motors at 3000psi (for illustrative
purpose only)

Representative Efficiency Contour for a typical
Swashplate Pump/Motors at 3000psi (for illustrative
purpose only)

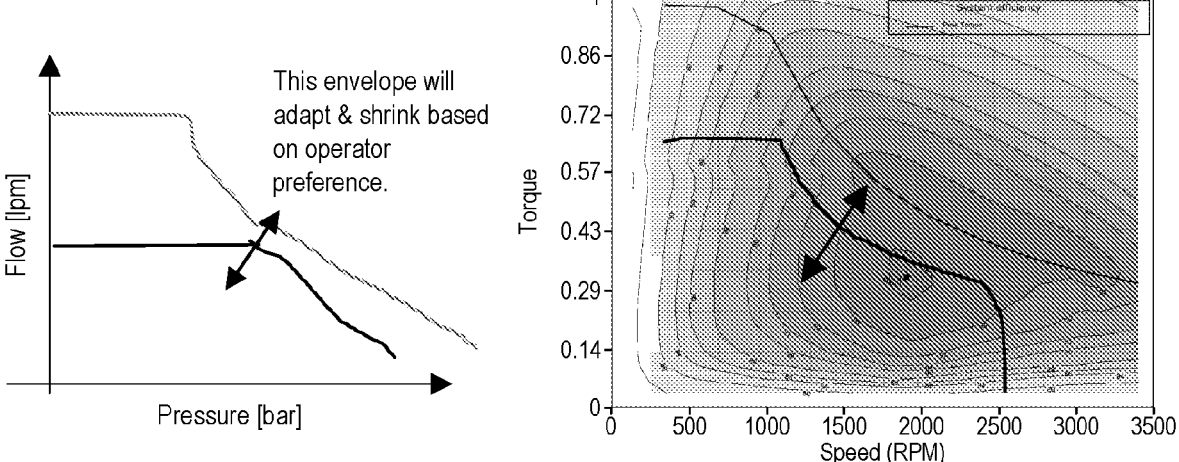

This envelope will adapt & shrink based on operator preference.

Fig. 10

| Mode | Motor | Battery Charge | Pump | Priority |
|------|-------|---------------|------|----------|
| Performance Mode | No Limit Motor | High(>70%) | Machine Controller will decide | Operator |
| Efficiency Mode | Motor Torque Limit | Medium (40-70%) | Identify efficient pump displacement & motor speed | Controller |
| Power Saver Mode Duty | Limit Motor Torque | Low (<40%) | Limit Pump Displacement | Controller |

Fig. 11

ELECTRIC POWERTRAIN WORK MODES

CROSS-REFERENCE TO RELATED APPLICATION

The present application is a U.S. national stage under 35 U.S.C. § 371 of International Application No. PCT/IB2021/059440, filed on Oct. 14, 2021, the entire disclosure of which is incorporated herein by reference for all purposes.

BACKGROUND OF THE INVENTION

With the implementation of battery and electric motor technology into off road vehicles, battery life and operating time becomes significant. In off-highway applications, machines can often run for many hours, or even continuous shifts. The hours operated by off highway vehicles are often orders of magnitude greater than those in on highway vehicles, and thus their requirement for electrification is often quite different between these applications. Operator knowledge of how many hours remain and how to operate the machine in a battery efficient way are important.

BRIEF SUMMARY OF THE INVENTION

The invention provides a control system for off-highway battery application powertrain systems that allows the operator to select one or more performance/operating modes. The one or more performance modes may be based on the work that needs to be accomplished using the machine vs. the hours needed before the next charge opportunity. Modes may typically take into consideration battery management system performance maps, Electric motor/inverter performance maps, pump performance maps and other systems communicating with the powertrain system. The operator is in control to optimize refill and/or next battery charge. The operator may have the option to select performance modes based on excavator performance vs. battery life. Remaining time, mode suggestions, and warning messages may be periodically sent to the operator based on the performance mode selected and current state of charge.

The operator is in control to optimize refill and/or next battery charge. The operator may have the option to select performance modes based on excavator performance vs. battery life. Messages may be periodically sent to the operator based on the performance mode selected (e.g., if the excavator is idling too long or battery life is low).

In a first aspect, the invention provides a controller for a hydraulically operated off-highway vehicle, the vehicle having an electric motor, a variable displacement hydraulic pump and a source of electrical power which is carried on the vehicle and which has a finite storage capacity, the motor being operable to drive the pump, and the source of electrical power being coupled to the motor to provide electrical power to drive the motor, the controller being arranged to control the pump displacement, and the motor speed, the controller being couplable to a human machine interface (HMI), for mounting in view of the vehicle operator and which is operable to take input from a vehicle operator and to display information to the vehicle operator, the controller further including map storage for storing an efficiency map for the pump which provides data about efficiency relative to pump displacement and speed at a set of different operating pressures, and a motor efficiency map which provides data about efficiency relative to motor speed and torque, whereby in use, the controller offers a plurality of efficiency modes to the user via the HMI, the operator chooses one of the modes via the HMI, and the controller is arranged in one of the efficiency modes to adjust motor speed and pump displacement dependent on a state of charge of the source of electrical power, and to iterate pump speed and displacement to provide a maximum overall efficiency of the motor and pump dependent on the stored efficiency maps.

In a second aspect, the invention provides a hydraulically operated off-highway vehicle, the vehicle having a controller, an electric motor, a variable displacement hydraulic pump and a source of electrical power which is carried on the vehicle and which has a finite storage capacity, the motor being operable to drive the pump, and the source of electrical power being coupled to the motor to provide electrical power to drive the motor, the controller being arranged to control the pump displacement, and the motor speed, the controller being couplable to a human machine interface (HMI), for mounting in view of the vehicle operator and which is operable to take input from a vehicle operator and to display information to the vehicle operator, the controller further including map storage for storing an efficiency map for the pump which provides data about efficiency relative to pump displacement and speed at a set of different operating pressures, and a motor efficiency map which provides data about efficiency relative to motor speed and torque, whereby in use, the controller offers a plurality of efficiency modes to the user via the HMI, the operator chooses one of the modes via the HMI, and the controller is arranged in one of the efficiency modes to adjust motor speed and pump displacement dependent on a state of charge of the source of electrical power, and to iterate pump speed and displacement to provide a maximum overall efficiency of the motor and pump dependent on the stored efficiency maps.

In a third aspect, the invention provides a method of controlling a variable placement pump and a motor in a hydraulically operated off-highway vehicle, the vehicle having a source of electrical power which is carried on the vehicle and which has a finite storage capacity, the motor being operable to drive the pump, and the source of electrical power being coupled to the motor to provide electrical power to drive the motor, and the vehicle further having a human machine interface (HMI), for mounting in view of the vehicle operator, the method comprising the steps of controlling the pump displacement, and the motor speed, taking input from a vehicle operator and displaying information to the vehicle operator via the HMI, storing an efficiency map for the pump which provides data about efficiency relative to pump displacement and speed at a set of different operating pressures, and a motor efficiency map which provides data about efficiency relative to motor speed and torque, offering a plurality of operating modes to the user via the HMI, the operator choosing one of the modes via the HMI, adjusting motor speed and pump displacement dependent on a state of charge of the source of electrical power, and iterating pump speed and displacement to provide a maximum overall efficiency of the motor and pump dependent on the stored efficiency maps.

In fourth aspect, the invention provides a computer-readable medium storing instructions that, when executed by a computer, cause it to perform the method of the third aspect above.

Preferably, the system is operable to set upper and/or lower torque limits for the motor based on the state of charge of the source of electrical power, and dependent on the stored motor efficiency map. This may provide an immediate improvement in efficiency by removing inefficient parts of the motor efficiency map from use.

In one efficiency mode the system may be operable to set upper displacement and/or flow rate limits for the pump based on the state of charge of the source of electrical power, dependent on the stored pump efficiency map, and responsive to user input to set an upper flow limit. In this way the output power of the system, and therefore the input power of the system may be limited at a user choice, providing a particularly efficient way to conserve energy in the power source.

Preferably, the system is operable to estimate a remaining time before the electrical power source will need recharging, based on the current efficiency mode selected and the state of charge of the electrical power source. This may then be displayed to a user via the HMI.

Advantageously, the system is operable to estimate a remaining time before the electrical power source will need recharging, based on an efficiency mode which is not currently selected, and the state of charge of the electrical power source. In this way, a user may be shown the trade-offs between the current selected mode and alternative modes, in terms of estimated remaining time.

Typically, the system is operable to automatically change to a more efficient mode if the state of charge of the electrical power source goes below a predetermined threshold. Thus the system can automatically conserve state of charge without operator intervention, as the state of charge decreases.

BRIEF DESCRIPTION OF THE DRAWINGS

Non-limiting and non-exhaustive embodiments of the present embodiments are described with reference to the following FIGURES, wherein like reference numerals refer to like parts throughout the various views unless otherwise specified.

FIG. 10 is a plot of motor efficiency and flow and pressure limits for the power saver mode;

FIG. 11 is a table showing characteristics of the different operating modes;

Figure 1:
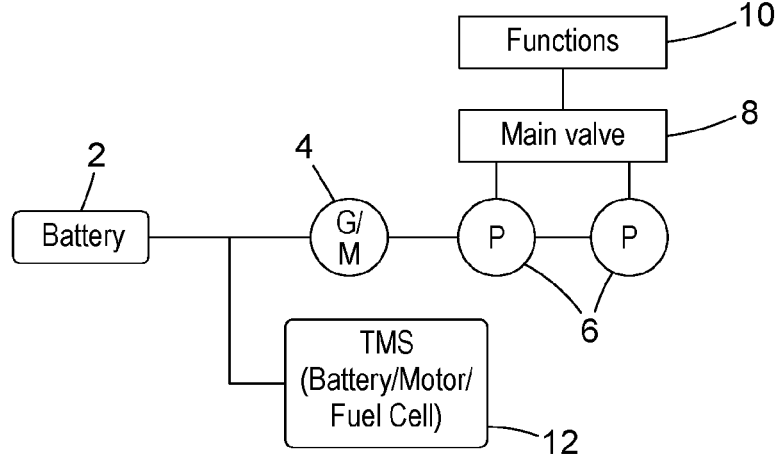
FIG. 1 is a schematic block diagram showing the vehicle components in a system with a battery.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

With reference to FIG. 1, a typical arrangement of an electrified off highway vehicle, such as an excavator, has a battery 2, a generator/motor arrangement 4, which is coupled to one or more hydraulic pumps 6. The pumps operate under the direction of a vehicle operator through a valve body 8 which then causes the off-road vehicle to operate functions 10, typically using hydraulic rams, such moving an excavator bucket.

The system typically includes a temperature monitoring system 12 and which typically monitors motor temperature, battery temperature and/or fuel cell temperature as appropriate, and ambient temperature.

The vehicle may be a pure electric vehicle or may be a hybrid vehicle with an alternative power source such as a combustion engine e.g. a diesel engine. In that case, the battery/fuel cell and electric components may supplement or replace certain parts of the power requirement from the combustion engine and allow improved efficiency e.g. through downsizing of the combustion engine.

Thus, in use, as the vehicle is operated, hydraulic pressure is applied to the various hydraulic functions 10 to cause the attached hydraulic actuators to do work. The work is applied via the motor mode of the generator/motor 4 to the pumps 6, which typically are variable displacement pumps. The system may also operate in a regenerative mode in which, for example, an excavator bucket is moving in the downward direction and thereby recovering gravitational potential energy which can be recycled using the generator/motor in a generator mode, back into the battery 2.

Figure 2:
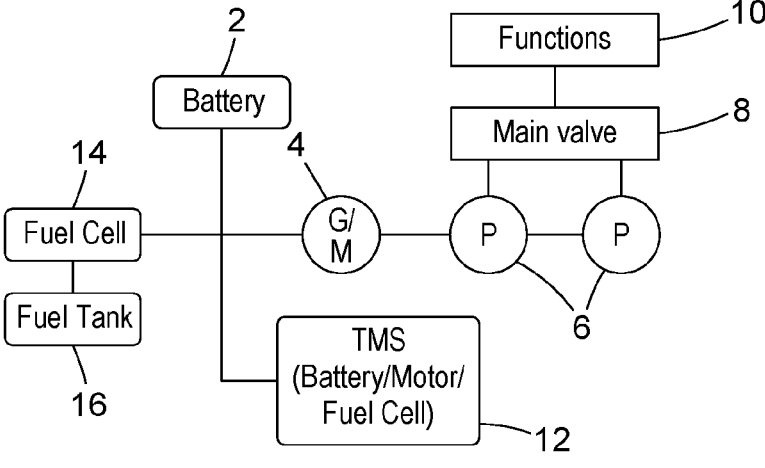
FIG. 2 is a schematic block diagram showing the vehicle components in a system with a fuel cell and a battery.

FIG. 2 shows an arrangement which also includes a fuel cell. Although this increases complexity, it overcomes a potential problem with operating hours in that the fuel cell 14 may be recharged from a fuel tank 16, typically with hydrogen, much more quickly than current battery technology allows. Thus, the present invention encompasses all possible combinations of combustion engine hybrids with battery alone, fuel cell alone or all three devices, and of course pure electric embodiments without any combustion engine power source. The control strategies described below will be applicable to all of these potential system applications.

During operation, the required force at particular implements on the vehicle is usually fixed by the use of the vehicle. This force will be a function of the hydraulic surface areas in the actuators—e.g. hydraulic rams, and also of the hydraulic pressure generated by the pump 6. Thus, in effect, this is a bounded parameter which must meet the requirement of the work that the vehicle is required to do at any particular time Thus an operator may vary this parameter but will have limited flexibility to choose low forces depending on application.

However, it will be appreciated that the power requirement depends not only on the force or pump pressure but also on the pump flow rate, which translates into speed of movement of the hydraulic actuator. Thus, flow rate and thus actuator speed is a variable that may be adjusted. With this in mind, the reader is now directed to FIGS. 3 and 4 which show efficiency plots for a typical electric motor and inverter combination (FIG. 3) and a typical variable displacement pump, in this case a swash plate pump (FIG. 4).

Figure 3:
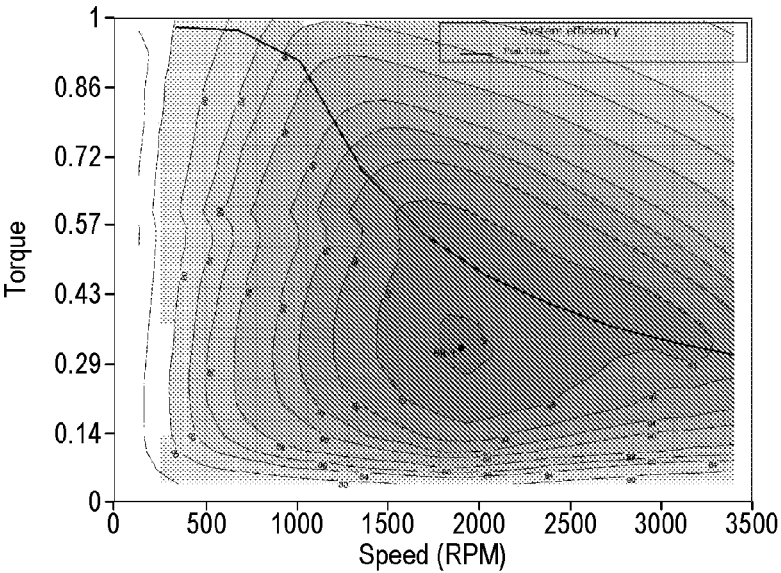
FIG. 3 is a plot of typical motor/inverter efficiency for speed against torque.

From FIG. 3, it will be noted that this particular motor has a high efficiency sweet spot with (greater than 93% efficiency between 1400 rpm and 2500 rpm; the most efficient speed being around 1,900 rpm, and a torque requirement between about 750 Nm and 1700 Nm with the highest efficiency being around 1200 Nm. At torques above or below this, efficiency reduces and at speeds above or below this, efficiency reduces, as the skilled person will understand, from the different efficiency contours in the Figure. Thus, there is an opportunity to maximise the energy efficiency of the system by operating the system to keep the electric motor operating at or close to this sweet spot, or at least as close as possible to this sweet spot, whilst balancing the other requirements of any particular application for the system.

Figure 4:
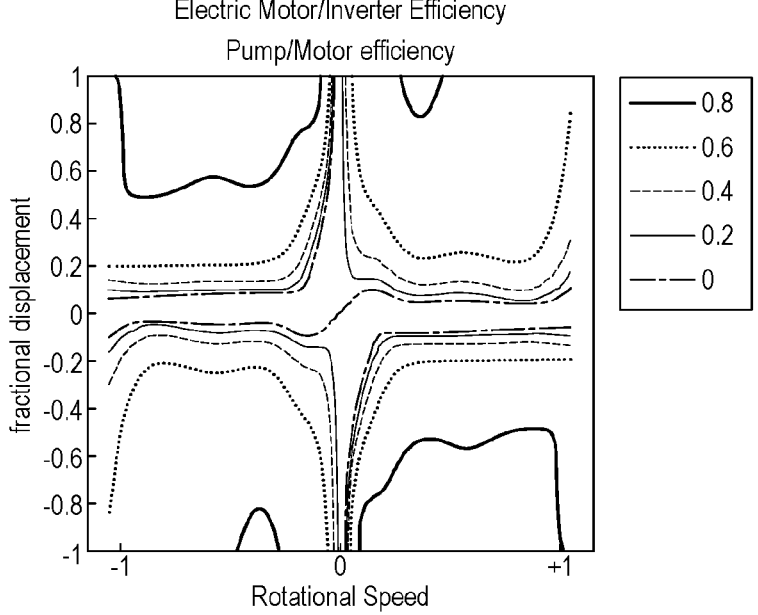
FIG. 4 is a plot of typical pump efficiency for rotational speed against fractional pump displacement.

Similarly, and with reference to FIG. 4, this plot shows that the greatest pump efficiencies occur when the pump is rotating well above zero rads/s and at relatively high fractional displacement (above 0.2 and ideally approaching 1, i.e. with the swash plate at its greatest angle). Thus as an example, the pump should be operated between 0.2 and 1 fractional displacement and at speeds above 20 rads/sec. An optimal efficiency sweet spot is achieved with a fractional displacement greater than 0.8 and at speeds between 100 and 400 rads/sec. Again, this provides an opportunity to improve overall system efficiency by varying the operating parameters of the pump.

Going back to first principles, it will be noted that the overall power produced by the combination of pump and motor is in the case of the pump, pressure multiplied by flow, and in the case of the motor, torque multiplied by speed. The flow in the pump is a function of speed multiplied by the displacement, or volume of fluid moved through the pump in each cycle.

Thus, the power output of the hydraulic system is equal to pump pressure×pump displacement×pump speed/Total Efficiency. As noted above, the pressure is effectively a controlled variable because it translates into the force available at the hydraulically powered actuator and if the force is insufficient for a particular application, it may be that the vehicle simply cannot operate as required. This leaves pump displacement and speed as variables that can be controlled in order to improve system efficiency.

Thus we describe in more detail below, methods and algorithms for operating the system in an efficient mode and providing the vehicle operator with ways of selecting desired operating modes to trade off operating time in between refills or recharging with vehicle functionality/power. By operating time, we mean the duration of usable of the vehicle before the battery and/or fuel cell is so depleted that the vehicle effectively can no longer be used without a battery recharge, or refill of the fuel cell tank.

In the preferred embodiment, the operator is provided with a user interface in the cab of the vehicle, which displays information provided by the controller, and also means to provide user input to the controller. This may be a display screen, possibly with touch functionality. Other suitable methods of user input using vehicle human machine interfaces will be known to the skilled artisan.

Figure 5:
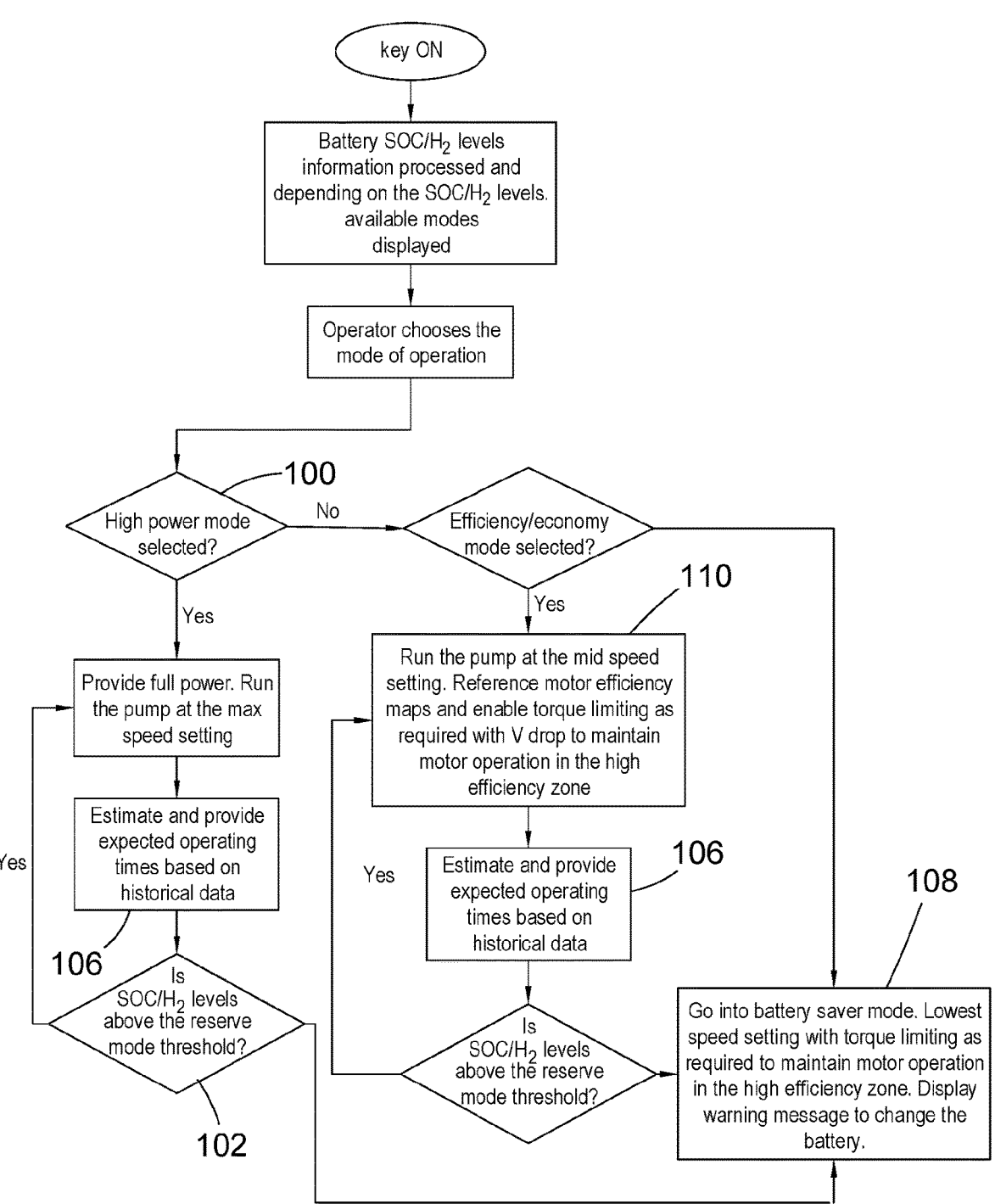
FIG. 5 is a flow chart showing an overall system operation.

With reference to the flowchart of FIG. 5, when the vehicle is turned on, SOC/H2 levels information is received by a controller (not shown) and depending on the SOC/H2 levels, the operator is provided with one or more operating mode options. If the SOC/H2 levels is high, the operator will be provided with more options which include less efficient but potentially more powerful operating modes. As SOC/H2 levels diminishes, the available options are reduced in number down to more efficient operating modes in which battery/fuel cell usage is reduced.

Depending on the use the vehicle is being put to, the operator will choose a suitable operating mode. The higher power modes typically will provide reduced operating time before re-charging/refuelling are required. If high power mode is selected (step 100) then effectively no limits are placed on the operating parameters of the electric motor and hydraulic pump. Hydraulic pump may typically run at a maximum speed setting and with no limits on pump displacement and thus hydraulic flow rates. And there are also no limits on electric motor torque. This provides fastest operation with maximum available breakout force for the vehicle functions. However, as noted below, it is quite likely to operate the motor and pump outside their most efficient operating envelopes and thus compromises battery life/fuel cell fuel consumption. For example, an excavator lifting relatively loosely packed earth may not need to operate in higher power modes as the breakout forces on the bucket and thus the boom and stick (or arm) components will be relatively low compared with manipulating dense materials such as heavy rocks. In the former case, a lower power setting will still allow the boom and stick to move relatively quickly because the required breakout forces are lower, even though the hydraulic flow rates and/or pressures may be reduced by operating in a more efficient mode, out of a higher power mode. A higher power mode may, for example, be appropriate where heavy duty work involving large forces is being carried out, but it is not desirable for the boom and stick to move slowly as a result.

In practice, at high load requirements, it is likely that the hydraulic pressure will need to be maintained, but reducing pump speed or fractional displacement, as in the middle efficiency power modes, will reduce flow rates, and will have the effect of reducing the speed of operation of the boom and stick, i.e. their speed of movement, while still retaining their level of available force, but enhancing the overall efficiency and thus extending operating time.

The controller enters into a loop in which it estimates and provides expected operating times to the user based on historical data and monitors the SOC/H2 levels. In the present context, the term "state of charge" (SOC) encompasses a battery state of charge, a fuel level in a fuel tank for a fuel cell or a combination of both where both systems are applied together. The system is thus operable to estimate a remaining time before the electrical power source will need recharging, based on an efficiency mode which is not currently selected, and the state of charge of the electrical power source. In this way, a user may be shown the trade-offs between the current selected mode and alternative modes, in terms of estimated remaining time. If the user is selected in one mode and the user notices that the remaining charge of battery will not last as long as the work that needs to be done, therefore they can select another mode that prolongs battery life while slightly reducing performance of the electric/hydraulic system.

If the SOC (or H2 level for a fuel cell implementation) remains above a predetermined threshold then operation continues as before. there may be a separate control loop in which the SOC/H2 level is monitored in order to determine which modes become available, and if necessary, to reduce the number of available modes during operation, as the SOC/H2 level reduces. SOC/H2 level monitoring may be carried out continuously or periodically and if the SOC/H2 level moves below a predetermined threshold, a warning is provided to the operator (step 104) that the system has a low SOC/H2 level and that there is limited ability to operate the system in a high power mode.

When the operator selects a particular mode, a calculation of how long the powertrain system can operate before needing a charge in this mode, is made and that information is sent to the user interface for display to the operator. The SOC/H2 level is monitored to ensure it is suitable to continue in the selected mode. If the SOC becomes less than that threshold then the system automatically moves to a more efficient lower power mode and sends a message to the operator via the user interface screen. With reference again to FIG. 5, this lesser mode may run the pump below high speed, e.g. at a mid-speed setting and reference motor efficiency maps and enable torque limiting as required, to maintain motor operation in its highest efficiency zone, commensurate with other requirements. Thus, the pump and motor are then operated in a more efficient mode so that SOC/H2 level reduction versus ultimate hydraulic power available, is made more efficient.

Some exemplary modes are shown and described in more detail below. A key point from the above, is that by actively controlling motor speed, and therefore flow rate in the pump, and motor torque which effectively translates into pump pressure, the overall system efficiency can be improved, compared with simply allowing the system to run with no such controls, e.g. at high speeds and high pump pressures. By using a variable displacement pump at the same time, the flow rate may be maintained at a desired rate, but the pump and motor may be operated in more efficient modes. This is achievable because increased displacement with a slower pump speed may produce the same flow rate as a faster speed with decreased displacement. Thus, the controller can trade off these parameters to ensure that the pump and motor produce the best overall efficiency.

The choice of operating modes is made available to the operator and thus they are provided with multiple operating mode choices and also these modes are cross-referenced with an automated assessment of the SOC which allows the system to determine which modes are feasible and provide only feasible modes as options to the operator. Thus, the entire complexity of improving efficiency of the vehicle is automated and left in the hands of the automated controller whilst the operator still has a good degree of choice about how to operate the vehicle. For example, if speed of doing a job is more important than being able to have a long work shift, high power mode may be selected, in which case the implements may operate more quickly and potentially with greater force. However, this will compromise battery life.

On the other hand, if a small compromise in operating speed and/or forces is acceptable in order to operate for longer before recharging, an alternative mode may be selected.

Figure 6:
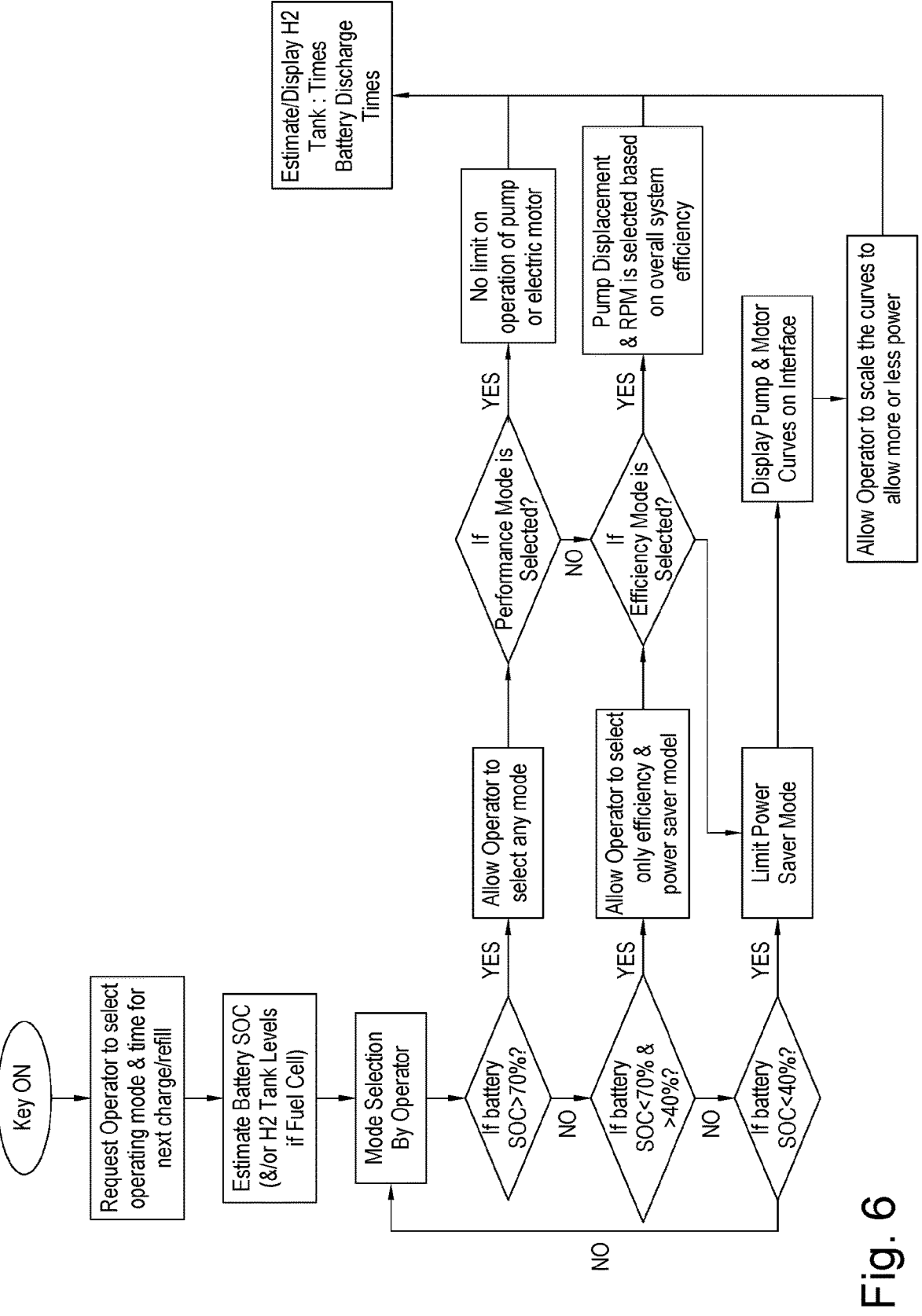
FIG. 6 is a flow chart showing selection of different operating modes.

Thus, with reference to FIG. 6, in this particular embodiment, three modes are available.

In a first mode, if the SOC is above an upper threshold such as 70%, any mode may be selected by the operator. For a SOC between that upper threshold and a lower threshold such as between 70% and 40%, the operator may select only two of three available modes, which in this case are considered to be efficiency mode, and power saver mode, and performance mode is disabled. Finally, if the SOC is less than the lower threshold, which in this example is 40%, then only power saver mode is made available to the operator.

In all cases, an estimated duration, for example of battery discharge and fuel cell tank capacity may be provided to the operator, to provide an indication of when recharging will be necessary. In the performance mode, there are no limits on operation of the pump or electric motor. In an efficiency (mid-range operating mode) the pump displacement and speed is automatically selected and controlled to ensure that the pump and motor operate in their most efficient regions, but potentially full power is available to the operator if necessary. In essence, the speed and displacement settings are optimised in this mode, which may mean that flow rate is not compromised at all, but the controller actively chooses a pairing of motor speed and pump displacement to maximise the overall efficiency of these two components when taken together, based on their known and pre calibrated efficiency maps.

In power saver mode, pump displacement and rpm are controlled and also torque limits are placed on the motor, which ultimately limits the power available from the system. The operator may choose the torque limit on the display which allows more or less power, but in the lower power modes will also limit what can be done with the vehicle.

The efficiency and power saver modes will now be described in more detail.

Figure 7:
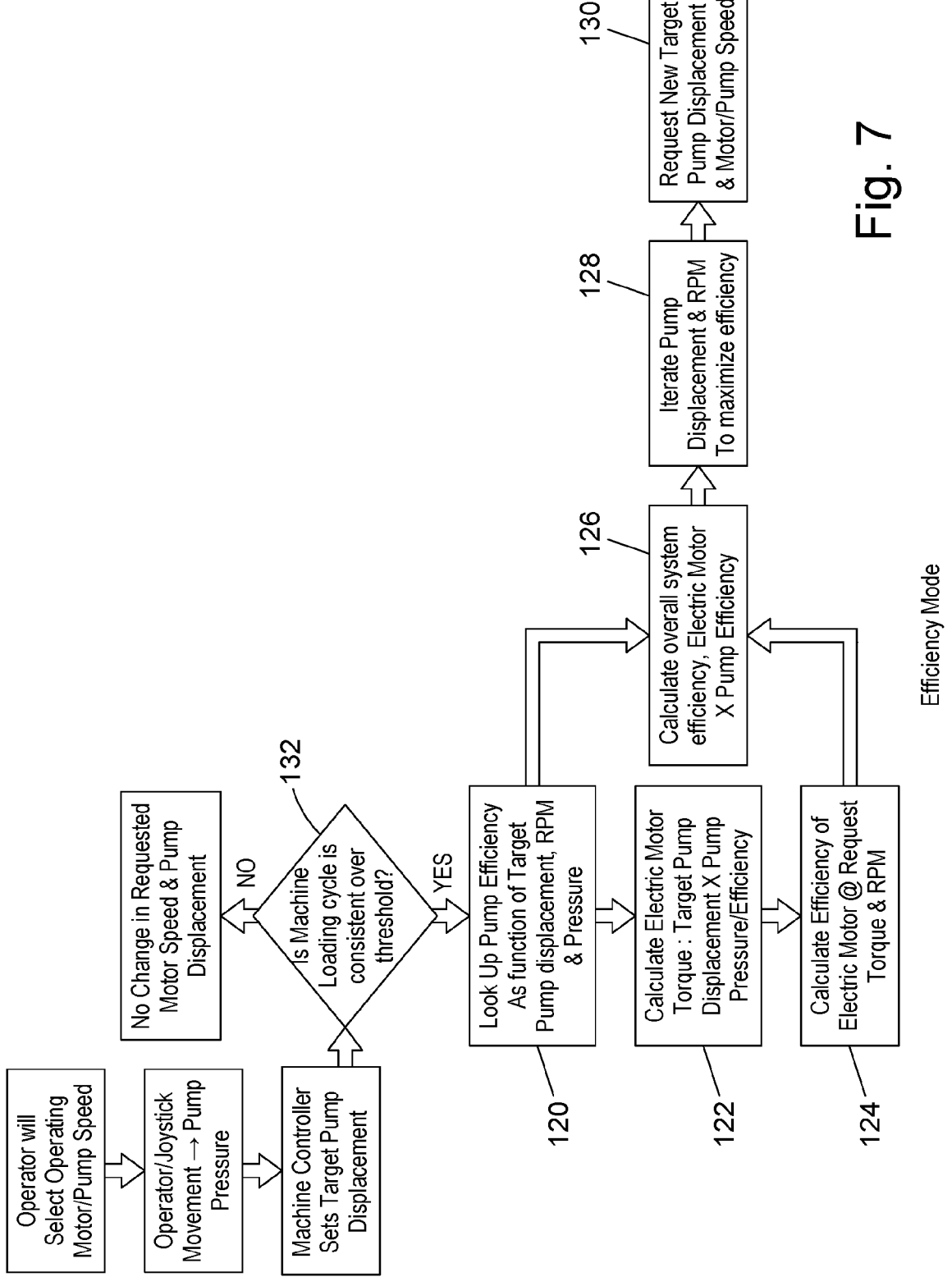
FIG. 7 is a flow chart showing an efficiency mode algorithm.
Figure 8:
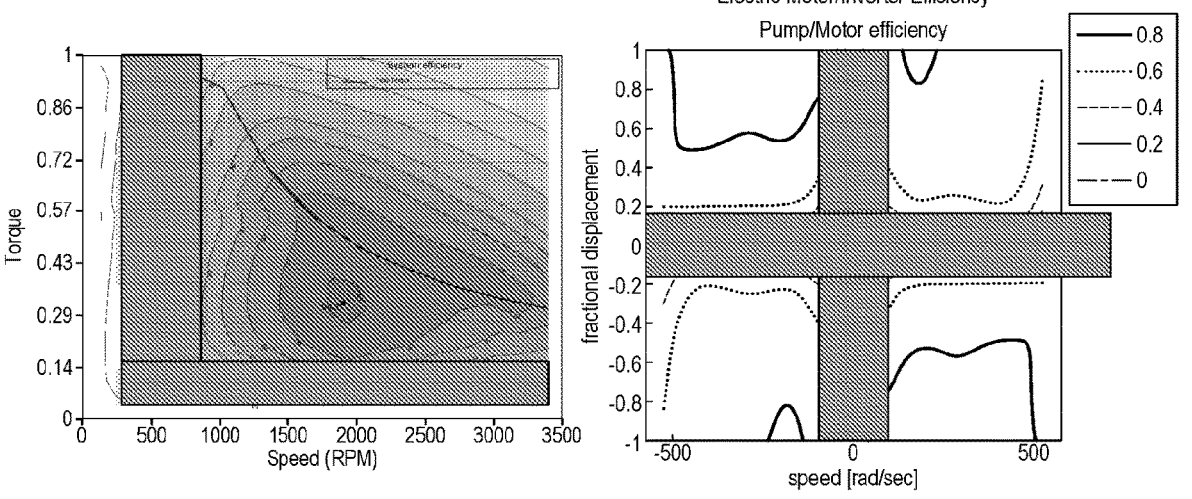
FIG. 8 is a plot of motor and pump efficiency showing limitations of operating points in the efficiency mode.

With reference to FIGS. 7 and 8, in efficiency mode, the electric motor is limited both in speed and torque so that it doesn't use its low extreme speed and low torque settings, which, with particular reference to FIG. 11 and the earlier equivalent figure, would take the motor out of its most efficient operating window. By doing this, full torque is still available and thus pump pressure and hydraulic operating force is not necessarily reduced.

On the right side of FIG. 1, similarly, the inefficient operating areas where the hydraulic pump displacement and/or speed are close to zero, are also removed from the pump operating envelope. Thus, with detailed reference to the algorithm set out in FIG. 10, the operator may select a pump speed which through mechanical gearing is also directly proportional to a motor speed and may also choose a pump pressure, which translates into a motor torque requirement and also an available operating force at the hydraulic actuator of the vehicle.

With these parameters, the controller chooses a target pump displacement which is optimised to ensure that the overall efficiency of the motor speed and pump rotational speed are in highly efficient areas of the operating envelopes of these two components. The algorithmic steps are shown in FIG. 7 in steps 120 to 130. The system includes stored tables showing the two-dimensional efficiency mappings for the pump and motor as shown graphically in FIG. 8, by the blanked out portions of the efficiency maps, which represents portions of the maps which are not entered during efficiency mode. These are exemplary tables and it will be understood that they will vary depending on the pump and motor construction and manufacturing etc. Nevertheless, the principles set out below are generally applicable. The controller looks up the pump efficiency as a function of the target pump displacement, rpm and pressure. The electric motor torque may then be calculated based on the target pump displacement multiplied by the pump pressure and efficiency and then the efficiency of the electric motor at the requested torque and rpm may then be looked up on its own efficiency table. The overall system efficiency may then be calculated as the product of the motor and pump efficiencies. The controller may then iterate these two parameters by varying the pump displacement and motor speed, carrying out the same calculation until a maximum overall efficiency is derived. At this point (step 130) the new target pump displacement and motor/pump speed may be sent to the devices.

As a further loop, in step 132, the machine loading cycle is checked to see if the demand is consistently above the power available given the current pump displacement and motor/pump speed set points. If the demand is greater than the currently deliverable power, then the iteration loop (steps 120 to 130) is made again with an increased pressure/torque requirement. Algorithm will continue to operate at steady electric motor speed and pump displacement calculated in previous step. Transient breaches of power limit may be allowed . . . e.g., +/−10-15%

Figure 9:
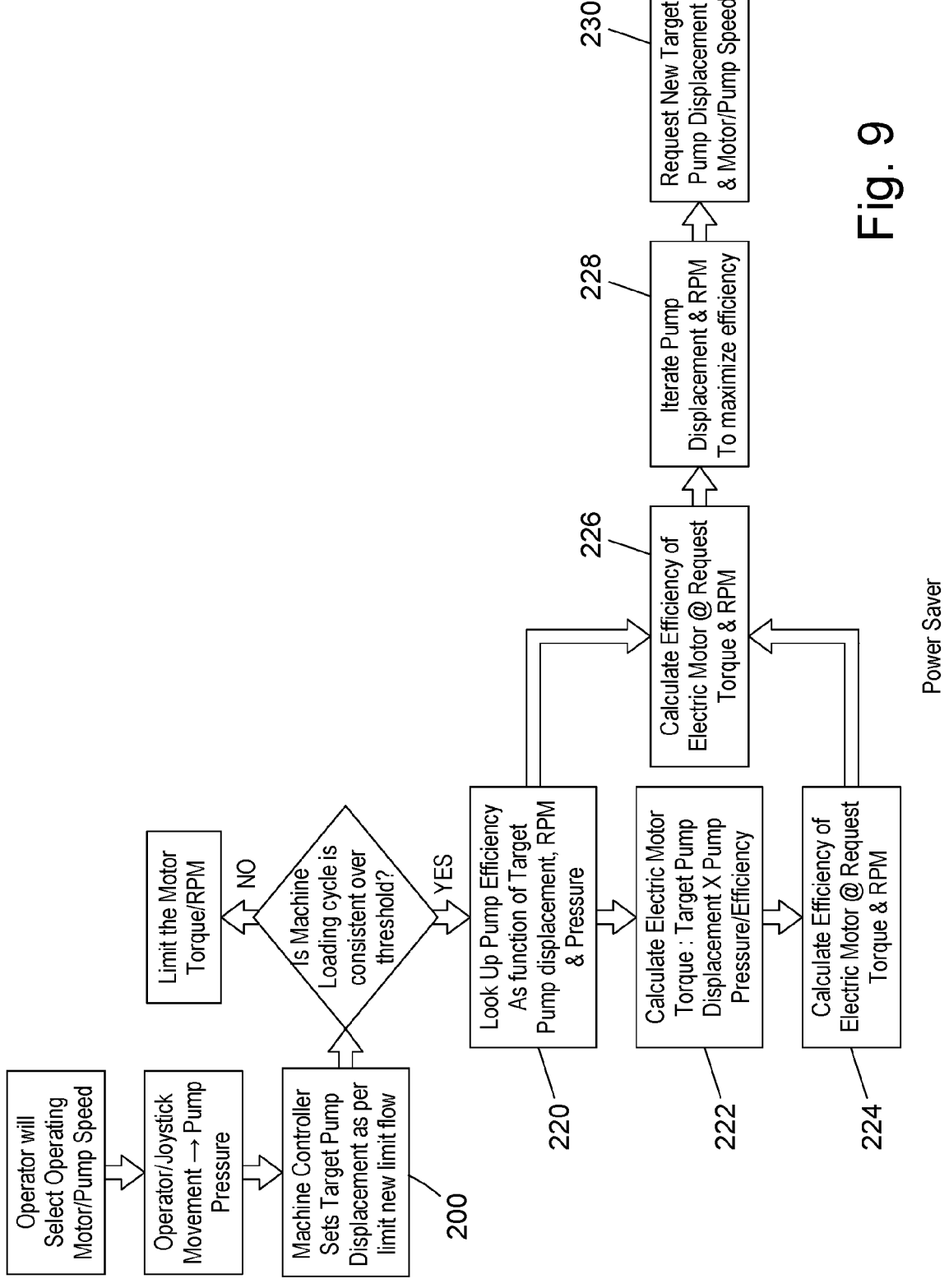
FIG. 9 is a flow chart showing a power saver mode algorithm.

With reference now to FIGS. 9 and 10, the power saver mode is now described. In this mode, the operator again selects a desired motor/pump speed and a pump pressure. However, with particular reference to FIG. 10, in this mode, the pump displacement is also limited to an upper threshold which may be chosen by the operator. In the left part of the Figure, it will be seen that by limiting flow in this way, and also torque, the operating part of the motor curve (see right side of FIG. 10) may be forced to be close to the most efficient portion, and also the overall power output (and therefore consumption) is reduced because flow rate is controlled as well as torque. And as noted earlier, in the case of the pump, power is hydraulic pressure multiplied by flow rate. In this mode, vehicle performance will be de-rated and is not suitable for high power demanding work modes.

Thus, and with reference to FIG. 11, the different operating modes may be characterised as in "performance mode" there is no limit on the motor at all and the machine controller decides what the pump should do based on the operator requests. In "efficiency mode" the motor torque is limited and the pump is controlled automatically to identify an efficient combination of hydraulic pump displacement and electric motor speeds, whilst delivering an appropriate flow rate. There will not be any perceived impact on vehicle performance in this mode. In "power saver mode" the motor torque is still limited but the pump displacement is limited at the same time, all under control of the automated controller.

This may be summarised as follows:—

Performance/Operating Modes

Performance—increase motor performance which will cause the SOC/H2 levels to diminish at a faster rate Efficiency—regular powertrain system calibration to optimise motor/pump performance for efficiency by varying pump displacement/speed. Normal motor performance and extend the battery charge or use of H2 in tank.

Power Saver—lower motor performance, reduce the use of the battery/fuel cell, therefore will cause the machine to perform longer before requiring another charge Thus, looking at the power saver algorithm set out in FIG. 9, in step 200, the machine controller sets a target pump displacement as in efficiency mode, but also sets a limit on flow rate, which is lower than the potential maximum flow rate, and thus reduces the potential power output of the system. In other respects, steps 220 to 230 are similar to steps 120 to 130 of FIG. 7, in iterating suitable pump displacement and rpm set points, but in this case with a reduced upper range of available pump displacements. The chosen flow rate is typically set by the operator using the control interface noted above. The consequences of different choices are displayed in terms of estimated operating time based on current SOC and modelled consumption at that chosen flow rate.

In step 232, the operating envelope versus the performance available using the current set points, is checked, and the set points varied if necessary in a similar way to step 132 in efficiency mode.

Persons having ordinary skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope.

Figure 12:
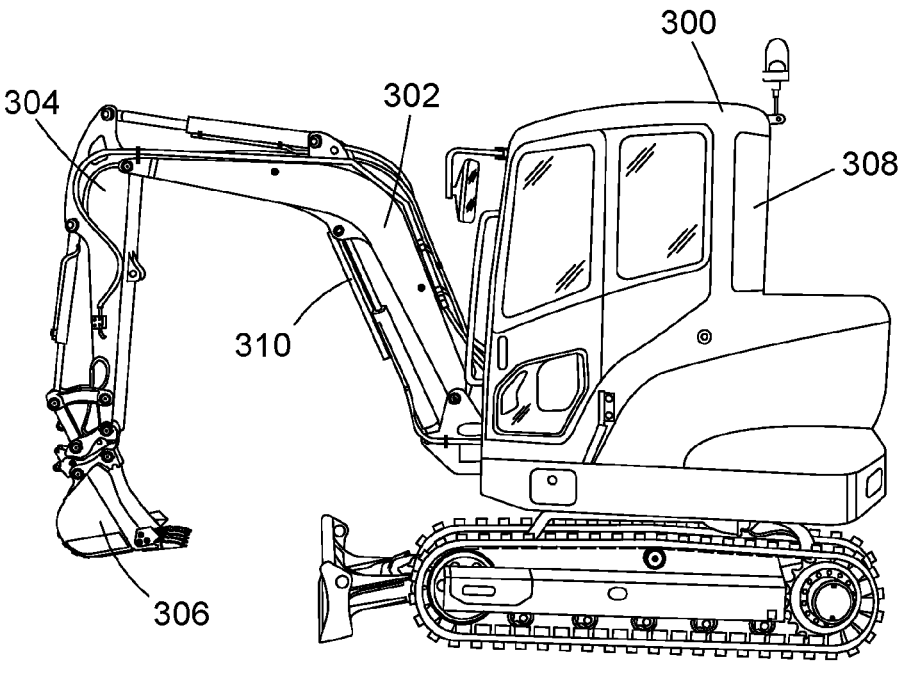
FIG. 12 is a schematic diagram of an excavator.

With reference to FIG. 12, an electric excavator 300 is shown. The excavator has a boom 302 and an arm 304. At the end of the arm is a bucket 306 for moving materials under control of an operator based in a cab 308.

The boom, arm and bucket are pivotally joined together and are actuated by three respective hydraulic actuators 310 to 314. With reference again to FIGS. 1 and 2, the actuators 310-314 correspond to the functions 10 in these Figures. Thus under control of the valve body 8, which is operated by controls in the cab, each of the actuators can be independently operated using pump pressure from pumps 6, to manipulate the bucket to carry out excavating work. In this case, the actuators are hydraulic rams which provide linear extension and retraction, but other actuators could be envisaged and indeed a device may have a combination of hydraulic and electric actuators and/or linear and/or non linear (e.g. rotary) actuators.

Figure 13:
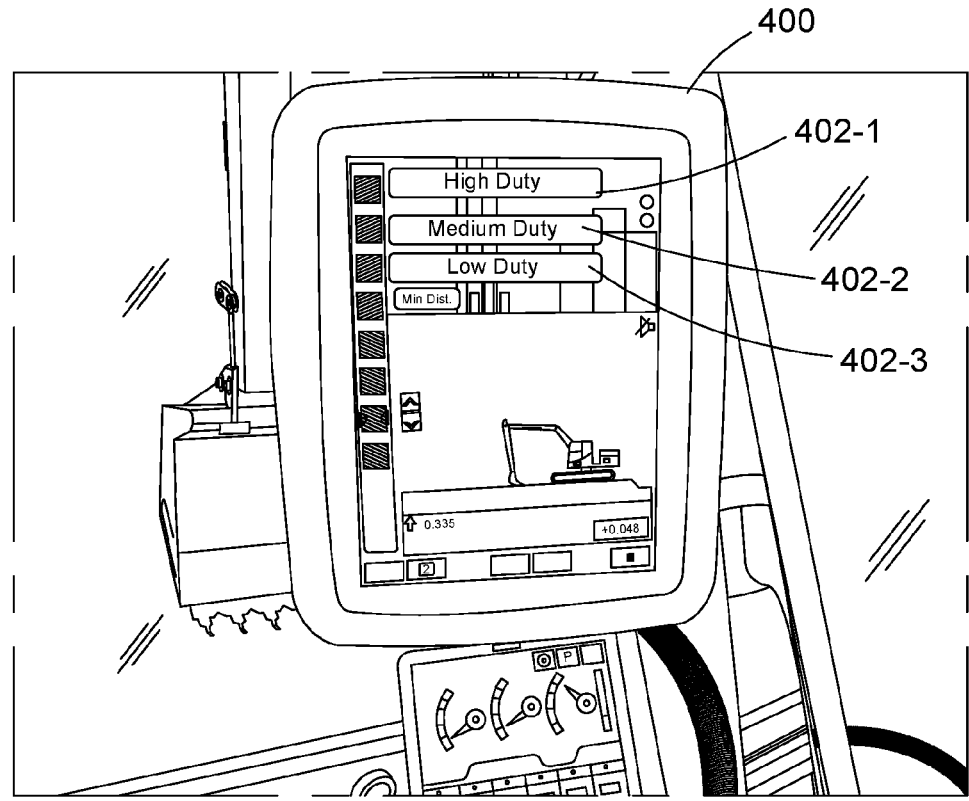
FIG. 13 is a schematic diagram of an HMI/user interface.

FIG. 13 shows a potential user interface 400 which in this example has three operating modes 402-1 402-2 and 402-3 which can be selected by a user. The user interface 400 is mounted in the cab 308 of the excavator 300.

The invention claimed is:

1. A controller for a hydraulically operated off-highway vehicle, comprising:

data storage for storing (a) a first efficiency map for a variable displacement hydraulic pump of the vehicle which provides data about efficiency relative to pump displacement and pump speed at a set of different operating pressures, and (b) a second efficiency map for an electric motor of the vehicle which provides data about efficiency relative to motor speed and motor torque, the motor being operable to drive the pump, the controller operable to:

display, on a user interface, a plurality of efficiency modes associated with the vehicle, wherein a subset of modes in the plurality of efficiency modes is selectable by a user, and the subset of modes is limited based on a state of charge of an electrical power source carried on the vehicle;

receive, from the user via the user interface, a user-selected mode that is selected by the user from the subset of modes;

adjust, based on the user-selected mode and the state of charge of the electrical power source, the motor speed and the pump displacement; and iterate, based on the first and second efficiency maps, the pump speed and the pump displacement to provide a maximum overall efficiency of the motor and the pump.

2. The controller of claim 1, wherein the controller is operable to set upper and/or lower torque limits for the electric motor based on the state of charge of the electrical power source or H2 levels in storage tank, and based on the second efficiency map.

3. The controller of claim 1, wherein the controller in one efficiency mode is operable to set upper displacement and/or flow rate limits for the pump based on the state of charge of the electrical power source, based on the first efficiency map, and responsive to user input to set an upper flow limit.

4. The controller of claim 1, wherein the controller is operable to estimate a remaining time before the electrical power source will need recharging, based on the user-selected mode and the state of charge of the electrical power source.

5. The controller of claim 4, wherein the controller is operable to cause the remaining time estimate to be displayed on the user interface.

6. The controller of claim 1, wherein the controller is operable to estimate a remaining time before the electrical power source will need recharging, based on an efficiency mode which is not currently selected, and the state of charge of the electrical power source.

7. The controller of claim 1, wherein the controller is operable to automatically change to a more efficient mode if the state of charge of the electrical power source goes below a predetermined threshold.

8. The controller of claim 1, wherein the electrical power source comprises a battery or a fuel cell.

9. The controller of claim 1, wherein the controller is configured to further limit the subset of modes from being selectable by the user by removing from the user interface at least one mode from the subset of modes based on detecting or estimating further reduction in the state of charge of the electrical power source to prevent the user from selecting the at least one mode that is removed from the user interface.

10. A hydraulically operated off-highway vehicle, the vehicle having a controller of claim 1.

11. A method of controlling a variable placement pump and a motor in a hydraulically operated off-highway vehicle, the method comprising the steps of:

(a) controlling pump displacement of the pump and motor speed of the motor;

(b) storing a first efficiency map for the pump which provides data about efficiency relative to the pump displacement and pump speed of the pump at a set of different operating pressures, and a second efficiency map which provides data about efficiency relative to the motor speed and motor torque of the motor;

(c) displaying, on a user interface, a plurality of operating modes associated with the vehicle, wherein a subset of modes in the plurality of operating modes is selectable by a user, and the subset of modes is limited based on a state of charge of an electrical power source carried on the vehicle;

(d) receiving, from the user via the user interface, a user-selected mode in the subset of modes that is selected by the user;

(e) adjusting, based on the user-selected mode and the state of charge of the electrical power source, the motor speed and the pump displacement; and (f) iterating, based on the first and second efficiency maps, the pump speed and the pump displacement to provide a maximum overall efficiency of the motor and the pump.

12. The method of claim 11, further comprising: setting, based on the second efficiency map and the state of charge of the electrical power source, upper and/or lower torque limits for the motor.

13. The method of claim 11, further comprising: setting, responsive to a user input to set an upper flow limit and based on the first efficiency map and the state of charge of the electrical power source, upper displacement and/or flow rate limits for the pump.

14. The method of claim 11, further comprising: estimating, based on the user-selected mode and the state of charge of the electrical power source, a remaining time before the electrical power source will need recharging.

15. The method of claim 14, further comprising: displaying the remaining time estimate on the user interface.

16. The method of claim 11, further comprising: estimating, based on a mode in the subset of modes which is not the user-selected mode and the state of charge of the electrical power source, a remaining time before the electrical power source will need recharging.

17. The method of claim 11, further comprising: automatically changing operation of the vehicle to a more efficient mode from the subset of modes than the user-selected mode if the state of charge of the electrical power source goes below a predetermined threshold.

18. The method of claim 11, wherein the electrical power source comprises a battery or a fuel cell.

19. The method of claim 11, further comprising: limiting the subset of modes from being selectable by the user by removing from the user interface at least one mode from the subset of modes based on detecting or estimating further reduction in the state of charge of the electrical power source to prevent the user from selecting the at least one mode that is removed from the user interface.

20. A computer-readable medium storing instructions that, when executed by a computer, cause the computer to perform the method of claim 11.

* * * * *